Oct. 22, 1957 W. G. SCHINSKE 2,810,897
CRIMP CONNECTOR

Filed March 27, 1953 2 Sheets-Sheet 1

Inventor
William G. Schinske
by Parker & Carter
Attorneys

Oct. 22, 1957　　W. G. SCHINSKE　　2,810,897
CRIMP CONNECTOR
Filed March 27, 1953　　　　　　　　　　2 Sheets-Sheet 2
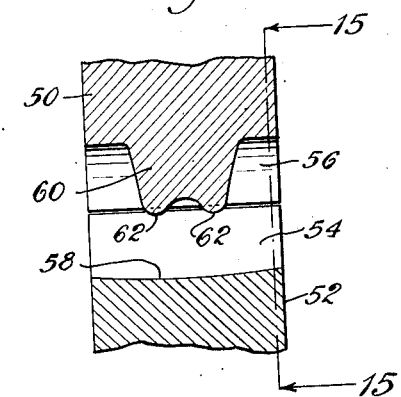
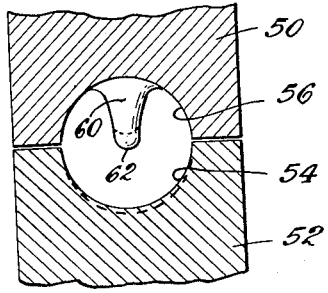
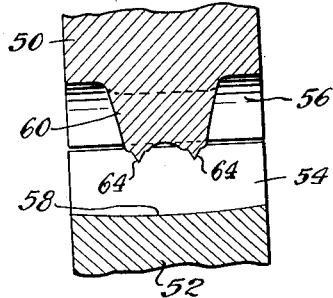
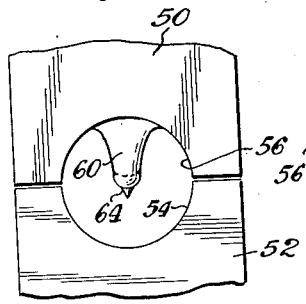
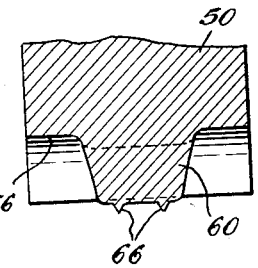
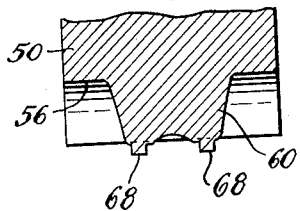
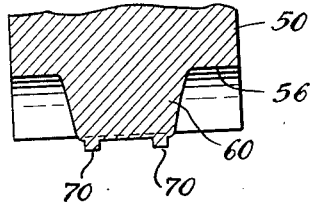
Inventor
William G. Schinske
by Parker & Carter
Attorneys

United States Patent Office 2,810,897
Patented Oct. 22, 1957

2,810,897
CRIMP CONNECTOR

William G. Schinske, Sycamore, Ill., assignor to Ideal Industries, Inc., Sycamore, Ill., a corporation of Delaware Application March 27, 1953, Serial No. 345,176

6 Claims. (Cl. 339—276)

My invention resides in the field of connecting elements for electrical circuits and the like and is an improvement on prior connecting devices for electric wires, leads, cables and the like. In general, my invention can be stated as and the like. In general, my invention can be stated as an improved form of connecting or holding element for either securing two or more wires or electrical leads together so as to complete an electrical circuit, or as an element for fastening or securing at least one wire, possibly two or more, to a base or support.

Therefore, an object of my invention is a new and improved electrical connector and the method of making it.

Another object is a new and improved electrical connector for joining at least two electric wires or cables together to thus form an efficient electric union.

Another object is a new and improved electric connecting means of the crimp connector type.

Another object is a new and improved connecting means for fastening at least two electric wires to a base or support.

Another object is a new and improved connecting means for joining at least two electrical wires with an improved holding strength and efficiency.

Other objects will appear from time to time in the ensuing specification and drawings in which:

Figure 14 is a sectional view of the crimping dies to form the crimp connection taken along line 14—14 in Figure 15;

Figure 15 is a sectional view taken along the line 15—15 of Figure 14;

Figure 16 is a sectional view similar to Figure 14 illustrating the crimping dies for making the crimp connection in Figure 8;

Figure 17 is a side view of the crimping dies in Figure 16; and

Figures 18, 19 and 20 are, respectively, the upper crimping dies for making the crimp connections illustrated in Figures 9, 10 and 11.

Figure 3:
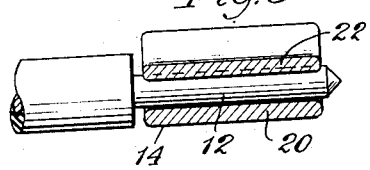
Figure 3 is a sectional view on line 3—3 of Figure 2.
Figure 2:
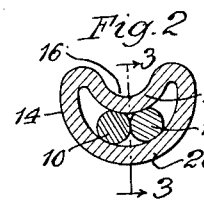
Figure 2 is a sectional view along line 2—2 of Figure 1.
Figure 1:
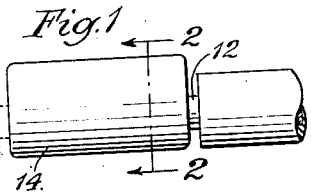
Figure 1 is a side view of one type of connector with which my invention is associated.

In Figures 1 through 3 I have shown a pair of electrical leads 10 and 12 which are secured together by a connecting element 14. I have shown the electrical leads as being provided with suitable insulation and such can be the case, if desired. However, it should be understood that my new and improved connector can be used with naked wires if such a structure is desirable. The connecting element may be composed of a cylindrical metal ring of the proper diameter, thickness and length and along its upper edges it has a longitudinally disposed groove or indentation 16 so that the element is divided into two portions, a convex portion 20 and a concave portion 22.

In Figure 2 the indentation 16 engages the ends of the leads 10 and 12 and is slightly depressed into the bare metal so as to firmly grasp both of them between the two portions 20 and 22 of the connecting element.

Figure 12:
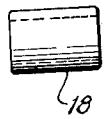
Figure 12 is a side view of the connecting element shown in Figures 1 through 11, on a reduced scale, prior to the crimping operation.
Figure 13:
Figure 13 is an end view of the uncrimped connecting element in Figure 12.

The element prior to the formation of the indentation 16 is in the form of a cylindrical ring or tube 18, as shown in Figures 12 and 13. The desired number of leads, it being understood that more than two can be used, are inserted into the interior of the tube until the ends of the leads protrude beyond the opposite edge of the tube. Then the indentation 16 is formed by a suitable tool, this being termed the crimping operation, and the indentation is depressed until the inner surface of portion 22 firmly engages, and, as a matter of fact, forms a slight indentation in the leads. Thus, in effect, as shown in Figure 2, the tube 18 is composed, after the crimping operation, of two portions, the larger uncrimped convex portion 20 and the smaller but crimped concave portion 22. Once the connection has been formed, the excess portion of the leads that protrude beyond the edge of the crimping element may be cut off by any suitable tool.

Figure 6:
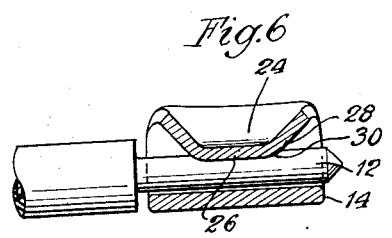
Figure 6 is a sectional view along line 6—6 of solid or non-braided Figure 5.
Figure 5:
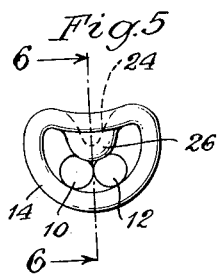
Figure 5 is an end view of the connector shown in Figure 4.
Figure 4:
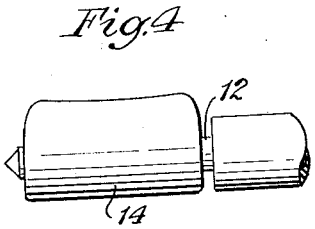
Figure 4 is a side view of another form of the connector shown in Figure 1.

In Figures 4 through 6, I have shown the indentation in a slightly different form. Note in Figure 3 that the indentation 16 extends longitudinally along the connecting element 20 from one end to the other; however, in Figure 6 the indentation 24 is disposed between the ends of the connecting element. The depressed portion 26 of the indentation firmly engages and projects slightly into the leads in a manner similar to that shown and described with reference to Figures 1 through 3.

Although I have shown and described with reference to Figures 1 through 6 the use of the connecting element with two electrical leads, it should be understood that the device can be used with a number of leads. For example, I have found that my particular connecting element can be used to secure as many as ten or twelve wires and even this should not be interpreted as an upper limit. Furthermore, this particular connecting element can be used to secure two or more wires to a base, support, or other suitable fixtures; and in this case the body of the connecting element may be provided with an apertured tab, that tab being designed to accept a conventional cap screw so that the connecting element may be secured along with the desired number of wires to a base or support. This type of structure is well known in the art and additional explanation is considered superfluous.

In addition, in Figure 1, I have shown in dotted lines the two electrical leads as approaching from opposite sides of the connecting element and it should be understood that all of the wires can enter the connecting element from one way, this being the general case. These are features well known to the art and are considered obvious alternatives from what is shown and described.

In Figures 7 through 11, I have shown modifications which can be applied to the indentations shown in Figures 1 through 6. It should be understood that any of the modifications in Figures 7 through 11 can be applied to the connecting element of Figure 3, as well as the element of Figure 6, even though I have shown Figures 7 through 11 in the form of Figure 6.

A connecting element of this type must have a certain holding or grasping power and prior to acceptance by the trade it will be subjected to rigid tests which determine accurately the efficiency of the electrical connection, the amount of tension or stress that can be placed on the connection and various other standard tests. If the body of the connector in either Figure 3 or 6 is secured and tension is applied to one or more of the wires, the main holding power is acquired by the engaging portion between the indentation or indented portion of the connector and the wire or wires. Note in Figure 6 that when tension is applied between the connecting element and one or more of the wires, although the indentation and the wires engage along a substantial portion of their length, this engagement is in a horizontal direction and the real holding power is acquired through the vertical engagement or the vertical portions of each of these units that engage one another. Thus, it is desirable that the indentation be depressed slightly into the body of the wires so that a vertical portion, such as the corner 28 of the indentation, firmly engages a relatively vertical portion, such as 30, of the wire to form a mechanical blocking type of connection. Therefore, during the crimping operation the indented portion of the connecting element is depressed into and slightly below the surface of the wire. The main strength of the connection between the element and the wire or wires is acquired through the engagement of these two somewhat vertical surfaces, and I have found that the efficiency and over-all strength of a connection of this type can be substantially increased by the provision of more than one pair of these somewhat vertical co-acting surfaces.

Figure 7:
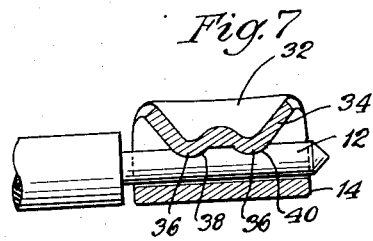
Figures 7 through 11 are sectional views similar to Figure 6 but showing various modifications of my new and improved connector.

For example, consider Figure 7, in which the connecting element is shown with an indentation 32 with an indented portion 34. The lowermost section of indented portion 34, instead of being substantially horizontal as shown in either Figure 3 or 6, is provided with a plurality of projections 36, each of these being substantially arcuate in form. In Figure 7, I have shown two such arcuate projections, and in a connector of this type this particular number is the most feasible; however, the invention is not limited to the use of just two such projections as more than two could be used in a somewhat different type of connector.

If tension is applied between the connector and two or more of the wires, instead of a single pair of engaging vertical surfaces as in Figure 6, I have at least two pairs of engaging surfaces, designated by the reference numerals 38 and 40. In effect, the lowest or innermost portion of the indentation has a somewhat undulating surface and by this my connector provides more than one blocking or contacting surface for the leads or wires.

Figure 8:
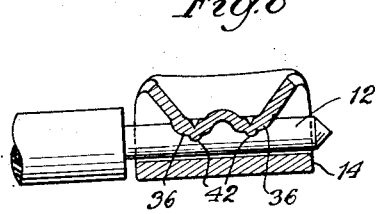

The same structure and result are effected in the modifications shown in Figure 8, except that the arcuate projections 36 are each identically provided with a pronounced pointed projection 42. It should be noted in this figure that the additional pointed projections extend to a pronounced degree substantially into the body of the wires. This structure effects an extremely efficient connector and the connection afforded by this structure represents a decided improvement over prior connecting elements.

Figure 9:
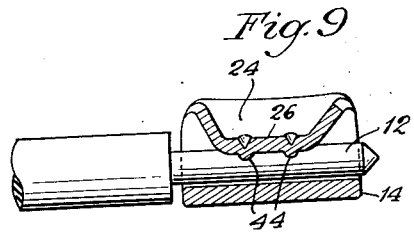

In Figure 9, I have departed somewhat from the arcuate projections 36 in Figure 7, but have provided, in effect, a flat portion in the bottom of the indentation 24 as in Figure 6 with a pair of pointed projections 44. A comparison between Figures 8 and 9 will reveal that the arcuate projections are no longer present and the pointed projections effect substantially the entire connection. It should be noted that the projections 44 in Figure 9 do not penetrate as far into the wire as do the projections 42 in Figure 8.

Figure 10:
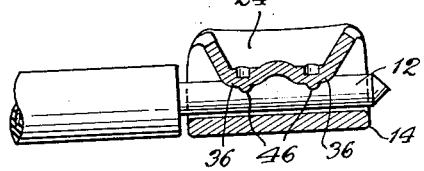
Figure 11:
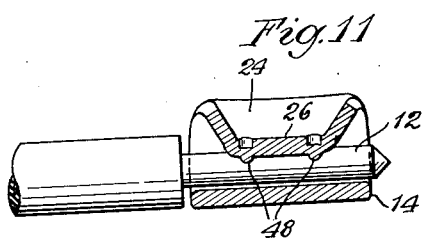

In Figures 10 and 11 I have shown another type of additional projection which can be provided in the bottom of the indentation. This projection is square in contour as compared to projections 42 and 44 in Figures 8 and 9 and can be applied to either the arcuate indentations 36, as shown in Figure 7, see reference numeral 46 in Figure 10, or can be applied simply to the indentation 24 in Figure 6, with a flat bottom, see reference numeral 48 in Figure 11. Therefore, I have two types of pronounced projections, the pointed type 42 and 44 in Figures 8 and 9 and the square type 46 and 48 in Figures 10 and 11. Each of these can be applied to either the arcuate indentations 36 in Figure 7 or the flat bottom 26 in the indentation 24 in Figure 6.

In addition, it should be noted that the arcuate projections and the undulating surface produced therewith in the bottom of indentation 32 in Figure 7 can easily be applied to the type of indentation shown in Figure 3. With this structure, the pointed projections of Figures 8 and 9 or the square projections of Figures 10 and 11 can be used to improve the connection and it should be understood that the pointed and square projections of Figures 8 through 11 are not restricted to the embodiment of Figures 6 and 7 alone.

In Figure 14, I have shown an upper die 50 and a lower die 52 which are movable toward and away from one another so as to oppose each other. Each of the dies is provided with a somewhat semi-circular elongated groove, these being designated by reference numerals 54 and 56, and the groove 54 in the lower die has an arcuate or concave lower surface 58. Depending from the semi-circular elongated groove 56 on the upper die is a crimping or main projecting element 60 with the lowermost portion thereof having a pair of arcuate projections 62. From this it can be seen that the main projection 60 with its two arcuate projections 62 will form the electrical crimp connection shown in Figure 7. The procedure for accomplishing this is to insert the cylindrical metal sleeve of Figures 12 and 13 between the dies with the stripped ends of the electrical wires therein, followed by the closing of the dies until they closely approach or contact one another, if necessary, during which the depending portion or projection 60 will contact the sleeve 18 and form the depression 32 shown in Figure 7.

I find that a much tighter and more efficient electrical connection can be formed by providing the lower die with a slightly concave bottom as shown at 58 of Figure 14 and it should be understood that the crimp connection of Figure 7 and the other figures, for that matter, can be formed with this lower slightly arcuate configuration and such a feature should be understood to be a part of the crimps of Figures 7 through 11. In addition, even though I have shown the lower die with its groove having a concave contour, it should be understood that a slightly convex contour will give equally satisfactory results.

Figures 16 and 17 illustrate the two co-acting dies for forming the Figure 8 crimp connection and these dies are approximately the same as the upper and lower dies 50 and 52 in Figures 14 and 15, except that the depending projections 62 are now each provided with a superimposed pointed projection 64. It will be noted that the co-acting dies of these figures are specifically designed to form the electrical crimp connection of Figure 8.

In Figure 18 I have shown only the upper die, as the lower die is the same as in Figures 15 through 17, for forming the electrical crimp connection of Figure 9. The protruding or main depending projection is smooth along its lower surface, except for a pair of pointed projections 66 which are similar to the pointed projections in Figures 16 and 17, except that the lower surface of the main projection does not have the undulating contour of Figure 14.

In a similar manner Figures 19 and 20 represent the upper die for forming the electrical crimp connections of Figures 10 and 11, Figure 19 illustrating the main depending portion with a pair of square or sharp cornered projections 68 superimposed on the undulating contour of Figure 14. In this sense the upper die in Figure 19 is related to the dies in Figures 16 and 14. On the other hand, Figure 20 represents the upper die performing the electrical crimp connection of Figure 11 and the lower surface of the depending portion has a pair of square projections 70 superimposed on a straight contour, much the same as Figure 18.

In all of the dies shown in Figures 14 through 20, it should be understood that the lower die may have either a slightly concave or convex contour so as to bow the cylindrical sleeve in either one direction or the other, and the main difference between the connections formed by dies of Figures 16 through 20 is the types of projections formed on the main depending portion of the upper die.

It should be noted that I have not shown any specific mechanism by which the dies are made to co-act with one another to form the various electrical connections shown and it should be understood that the dies can be formed in any conventional press, portable and hand manipulated tool, bench attachment or the like without departing from the spirit of my invention and the means for acquiring relative motion between the dies is unimportant. It should also be understood that my designation of "upper" and "lower" as applied to the dies is merely a relative term used for descriptive purposes only.

I also contemplate the use of this type of connecting means and the various modifications thereof with wires made of any material and my connector has been used effectively with wires of copper and aluminum. In addition, the wires can be all solid, all stranded, or combinations of solid and stranded, and my connector has shown improved results.

Whereas I have shown and described the selected form of my crimp connecting element and the dies for forming the same, along with various modifications thereof, it should be understood that various alterations and changes can be made without departing from the fundamental inventive theme which prevails throughout the disclosure and I wish that my invention be interpreted broadly and unrestricted except by the appended claims.

I claim:

1. In an electrical connection of the crimp type, at least two wires and a tubular metal sleeve surrounding them, the diameter of the wires being substantially smaller than and related to the inside diameter of the sleeve, such that the wires fill only a minor portion of the sleeve before it is crimped, a longitudinal indentation on one side of the sleeve generally parallel to the wires and extending a substantial distance toward the opposite side of the sleeve so as to engage and slightly indent the wires, the indentation in the sleeve being longitudinally arcuate and having a diameter less than but related to the original sleeve diameter, such that the wires will be entrapped by the indentation against the opposite side of the sleeve under substantial pressure in contact with each other as well as in contact under pressure with the indented and unindented sides of the sleeve.

2. The structure of claim 1 in which the longitudinal indentation has a longitudinal undulating configuration with at least two minor longitudinally arcuate indentations projecting between and into the wires.

3. The structure of claim 1 wherein the longitudinal indentation has at least two minor sharp cornered indentations projecting between and into the wires.

4. The structure of claim 1 further characterized in that the longitudinal indentation includes at least two minor indentations projecting toward the unindented side of the sleeve.

5. In an electrical connection of the crimp type, at least two wires and a tubular metal sleeve surrounding them, the diameter of the wires being substantially smaller than but related to the inside diameter of the sleeve, such that the wires fill a minor portion of the sleeve before it is crimped, an indentation on one side of the sleeve extending longitudinally and generally parallel to the wires, said indentation also extending laterally a substantial distance toward the opposite side of the sleeve in indenting relationship with the wires, the indentation being arcuate in lateral cross section and having a diameter less than but related to the diameter of the sleeve's unindented side, such that the wires will be entrapped by the indentation against the unindented side of the sleeve under substantial pressure in contact with each other as well as in contact under pressure with both the indented and unindented sides of the sleeve.

6. The structure of claim 5 further characterized in that the longitudinal indentation includes at least two minor indentations projecting toward the unindented side of the sleeve.

References Cited in the file of this patent

UNITED STATES PATENTS

| | | |
|---|---|---|
| 1,654,340 | McIntosh | Dec. 27, 1927 |
| 2,109,837 | Davis | Mar. 1, 1938 |
| 2,133,364 | Temple | Oct. 18, 1938 |
| 2,210,804 | Eby | Aug. 6, 1940 |
| 2,275,163 | Thomas | Mar. 3, 1942 |
| 2,327,650 | Klein | Aug. 24, 1943 |
| 2,413,547 | Davidson | Dec. 31, 1946 |
| 2,426,492 | Dupre | Aug. 26, 1947 |
| 2,535,013 | Freedom | Dec. 19, 1950 |
| 2,551,299 | Sowa | May 1, 1951 |
| 2,586,471 | Matthysse | Feb. 19, 1952 |
| 2,604,508 | Bergan | July 22, 1952 |
| 2,685,076 | Hoffman | July 27, 1954 |